(12) United States Patent
Kawano et al.

(10) Patent No.: US 10,895,583 B2
(45) Date of Patent: Jan. 19, 2021

(54) TURBO ROTATION SENSOR

(71) Applicant: Hitachi Metals, Ltd., Tokyo (JP)

(72) Inventors: Kei Kawano, Tokyo (JP); Takashi Onimoto, Tokyo (JP); Yuta Sugiyama, Tokyo (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 16/283,959

(22) Filed: Feb. 25, 2019

(65) Prior Publication Data

US 2019/0361043 A1 Nov. 28, 2019

(30) Foreign Application Priority Data

May 25, 2018 (JP) .................................. 2018-100886
Sep. 4, 2018 (JP) .................................. 2018-165005

(51) Int. Cl.
*G01P 3/487* (2006.01)
*F01D 17/06* (2006.01)
*G01D 5/14* (2006.01)
*G01P 3/488* (2006.01)

(52) U.S. Cl.
CPC .............. *G01P 3/487* (2013.01); *F01D 17/06* (2013.01); *G01D 5/145* (2013.01); *G01P 3/488* (2013.01); *F05D 2220/40* (2013.01); *F05D 2270/02* (2013.01)

(58) Field of Classification Search
CPC .. G01P 3/44; G01P 3/487; G01P 3/488; G01P 3/49; F01D 17/06; G01D 5/145; F05D 2220/40; F05D 2270/02; F02C 6/12
See application file for complete search history.

(56) References Cited

U.S. PATENT DOCUMENTS 5,341,097 A * 8/1994 Wu .......................... G01B 7/14
324/207.12
2007/0186551 A1 8/2007 Ante et al.

FOREIGN PATENT DOCUMENTS

JP 2008-506074 A 2/2008
WO WO-2017213004 A1 * 12/2017 ............. F01D 17/06

* cited by examiner

*Primary Examiner* — Jesse S Bogue
*Assistant Examiner* — Loren C Edwards
(74) *Attorney, Agent, or Firm* — Roberts Calderon Safran & Cole P.C.

(57) ABSTRACT

A turbo rotation sensor, which is configured to be mounted on a turbocharger provided with a compressor including a rotary driven compressor wheel housed in a compressor housing, to detect rotation speed of the compressor wheel, is composed of a magnet rotatable integrally with the compressor wheel and having a plurality of magnetic poles in a circumferential direction of the compressor wheel, and a sensor section attached to the compressor housing and including first and second magnetic detection elements capable of detecting a magnetic field in a radial direction of the compressor wheel due to the magnet. The first and second magnetic detection elements are arranged side by side in the radial direction of the compressor wheel. The rotation speed of the compressor wheel can be measured based on a difference between detection results of the first and second magnetic detection elements resulting from a difference between their respective distances from the magnet.

14 Claims, 7 Drawing Sheets

CHARGE

MAGNETIZATION DIRECTION

TURBO ROTATION SENSOR

CROSS-REFERENCE TO RELATED APPLICATIONS

The present application is based on Japanese patent application No. 2018-100886 filed on May 25, 2018 and Japanese patent application No. 2018-165005 filed on Sep. 4, 2018, the entire contents of which are incorporated herein by reference.

BACKGROUND OF THE INVENTION OF THE INVENTION

1. Field of the Invention

The present invention relates to a turbo rotation sensor and a turbocharger.

2. Description of the Related Art

Conventionally, as a turbo rotation sensor for detecting the rotation speed of a turbocharger mounted on a vehicle, there is known a turbo rotation sensor having a magnet which rotates integrally with a compressor wheel to detect a change in magnetic field due to the magnet with a magnetic detection element and thereby detect the rotation speed (number of rotations) of the turbocharger (see, e.g. JP-A-2008-506074).

SUMMARY OF THE INVENTION

In the turbo rotation sensor using the magnet and the magnetic detection element as described above, the magnetic detection element detects an extraneous magnetic field derived from each kind of control devices, for example, and this extraneous magnetic field becomes noise, which may lead to inability to accurately detect the rotational speed of the turbocharger. Therefore, a turbo rotation sensor which is not easily affected by external noise is desired.

Further, for example, when a sensor section or the like having the magnetic detection element mounted thereon is configured to protrude into an intake passage, it is considered that the intake air is hindered and the performance of the turbocharger is deteriorated, that the pressure of the intake air adversely affects the sensor section, etc., therefore it is desirable that the sensor section be provided so as not to protrude into the intake passage. In this case, however, the distance between the magnetic detection element and the magnet becomes large, and the detection accuracy may lower. Therefore, a turbo rotation sensor that can accurately detect the rotational speed of the turbocharger with its sensor section not protruded into the intake passage is desired.

It is therefore an object of the present invention to provide a turbo rotation sensor and a turbocharger which are less susceptible to external noises and which can accurately detect the rotational speed of a turbocharger with its sensor section not protruded into an intake passage.

In order to solve the above problems, the present invention provides a turbo rotation sensor, which is configured to be mounted in a turbocharger provided with a compressor including a rotary driven compressor wheel housed in a compressor housing, to detect rotation speed of the compressor wheel, comprising: a magnet rotatable integrally with the compressor wheel and having a plurality of magnetic poles in a circumferential direction of the compressor wheel; and a sensor section attached to the compressor housing and including first and second magnetic detection elements capable of detecting a magnetic field in a radial direction of the compressor wheel due to the magnet, wherein the first and second magnetic detection elements are arranged side by side in the radial direction of the compressor wheel, wherein the rotation speed of the compressor wheel can be measured based on a difference between detection results of the first and second magnetic detection elements resulting from a difference between their respective distances from the magnet.

Further, in order to solve the above problems, the present invention provides a turbocharger, comprising: a compressor including a rotary driven compressor wheel housed in a compressor housing; a magnet rotatable integrally with the compressor wheel and having a plurality of magnetic poles in a circumferential direction of the compressor wheel; and a sensor section attached to the compressor housing and including first and second magnetic detection elements capable of detecting a magnetic field in a radial direction of the compressor wheel due to the magnet, wherein the first and second magnetic detection elements are arranged side by side in the radial direction of the compressor wheel, wherein the rotation speed of the compressor wheel can be measured based on a difference between detection results of the first and second magnetic detection elements resulting from a difference between their respective distances from the magnet.

[Points of the Invention]

According to the present invention, it is possible to provide the turbo rotation sensor and the turbocharger which are less susceptible to external noises and which can accurately detect the rotational speed of the turbocharger with its sensor section not protruded into an intake passage.

DETAILED DESCRIPTION OF THE PREFERRED EMBODIMENTS

Embodiment

An embodiment of the present invention will be described below with reference to the accompanying drawings.

(Explanation of Turbo Charger)

Figure 1:
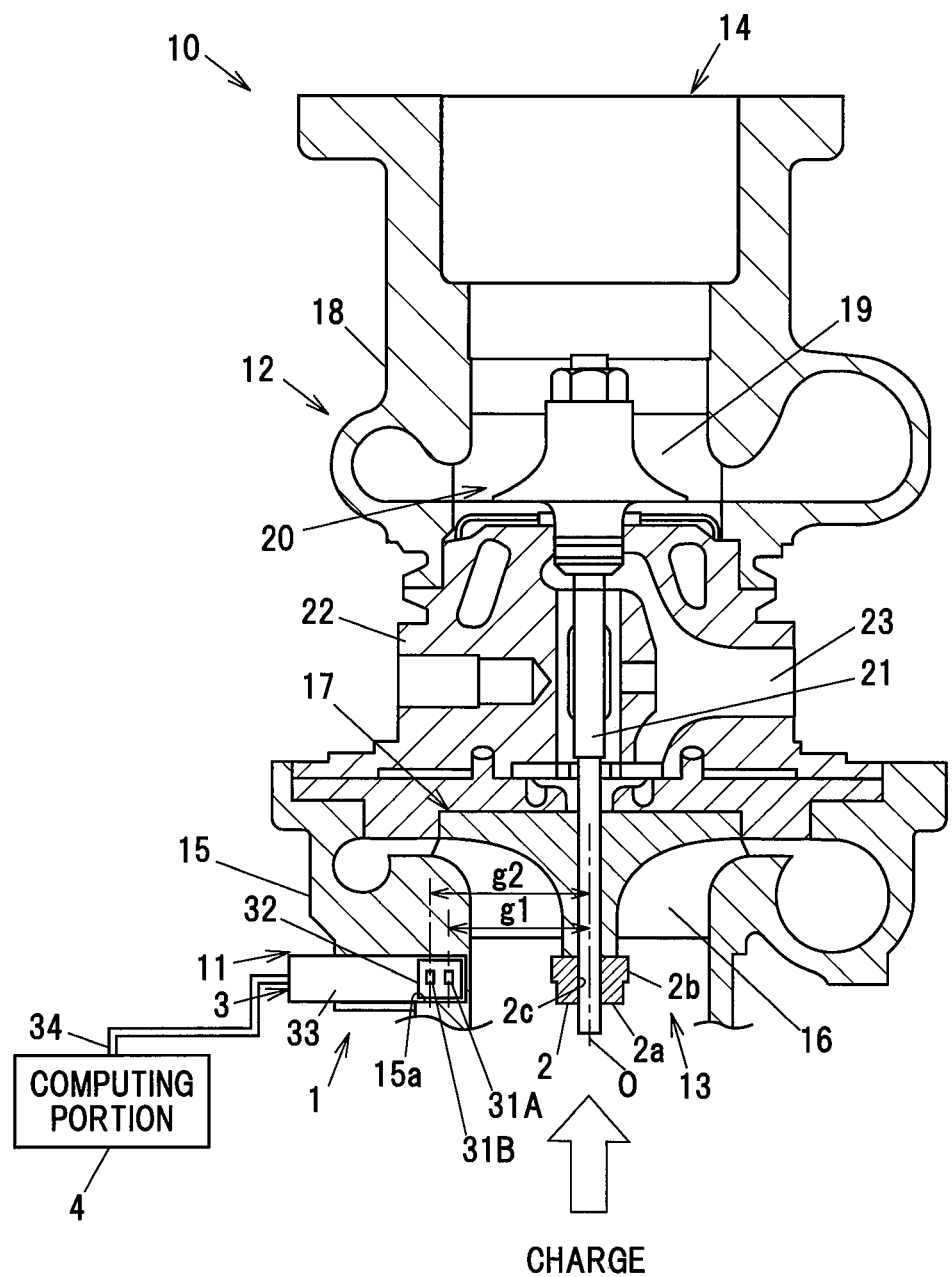
FIG. 1 is a schematic configuration diagram of a turbocharger mounted with a turbo rotation sensor according to one embodiment of the present invention.

FIG. 1 is a schematic configuration diagram of a turbocharger mounted with a turbo rotation sensor according to the present embodiment.

As shown in FIG. 1, the turbocharger 10 includes a compressor 11 provided in an intake passage 13 of an internal combustion engine (not shown) of a vehicle, and a turbine 12 provided in an exhaust passage 14 of the internal combustion engine.

The compressor 11 is configured in such a manner as to accommodate a compressor wheel 17 having a plurality of compressor blades 16 within a compressor housing 15. In addition, the turbine 12 is configured in such a manner as to house a turbine wheel 20 having a plurality of turbine blades 19 within a turbine housing 18. The turbine 12 is configured to receive the exhaust from the internal combustion engine with the turbine blades 19 and rotary drive the turbine wheel 20.

The compressor wheel 17 and the turbine wheel 20 are coupled together by a turbo shaft 21, and the compressor wheel 17 is configured to be rotary driven by the rotation of the turbine wheel 20. As a result, the turbocharger 10 is configured in such a manner that the compressor wheel 17 is rotary driven as the turbine wheel 20 rotated by the exhaust from the internal combustion engine is rotated, whereby the intake air is compressed and sent into the internal combustion engine.

The turbo shaft 21 is pivotably supported to a bearing housing 22 that couples the compressor housing 15 and the turbine housing 18 together. The bearing housing 22 is formed with an oil passage 23 for lubricating oil for lubrication and cooling of the turbo shaft 21 to be supplied, so that the heat on the turbine 12 side is prevented from being transmitted to the compressor 11 side by the cooling effect of the lubricating oil supplied to the oil passage 23.

The compressor housing 15 is nonmagnetic and has electrical conductivity. In the present embodiment, the compressor wheel 17 including the compressor housing 15 and the compressor blades 16 is made of aluminum (or an aluminum alloy). Note that the compressor wheel 17 may be made of a nonmagnetic material such as resin.

Figure 2:
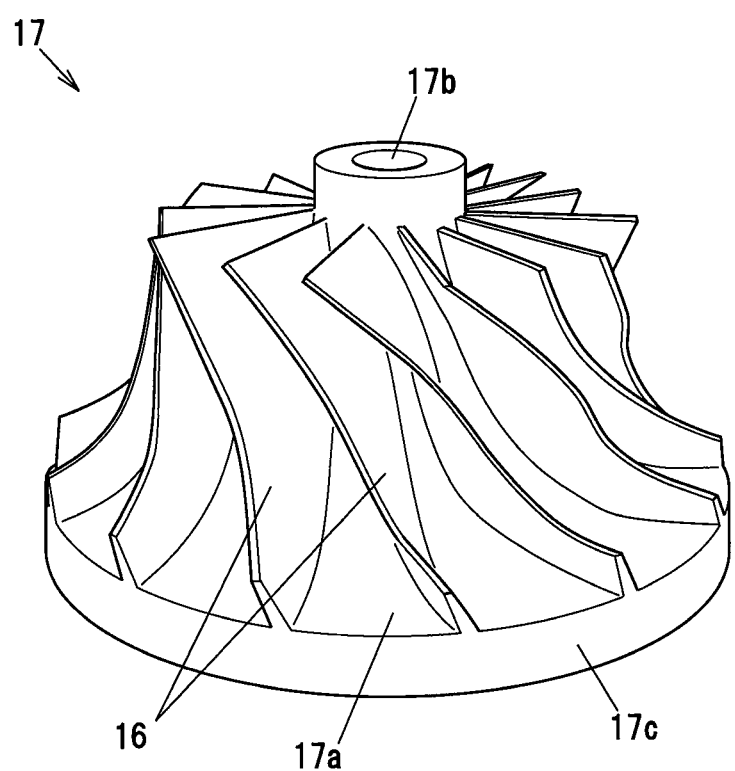
FIG. 2 is a perspective view of a compressor wheel.

As shown in FIG. 2, the compressor wheel 17 is formed by integrally forming a plurality of compressor blades 16 on a side surface of a base body 17a having a side surface curved so that its diameter gradually increases from its tip side (inlet side of intake air, upper side in the drawing) toward its base end side (turbine side, lower side in the drawing), in such a manner that the compressor blades 16 are inclined with respect to the axial direction. A through hole 17b into which the turbo shaft 21 is inserted and coupled is formed in the center portion of the base body 17a. The base body 17a has a substantially disk-shaped base end portion 17c extended toward the base end side (turbine side) relative to the compressor blades 16.

(Explanation of Turbo Rotation Sensor 1)

The turbocharger 10 is mounted with a turbo rotation sensor 1 for detecting the rotation speed of the turbocharger 10, that is, the rotation speed of the compressor wheel 17.

The turbo rotation sensor 1 includes a magnet 2 provided so as to rotate integrally with the compressor wheel 17 at an end portion on the intake side of the compressor wheel 17 (an end portion on the opposite side to the turbine 12), and a sensor section 3 having first and second magnetic detection elements 31A and 31B capable of detecting a magnetic field in a radial direction of the compressor wheel 17 due to the magnet 2.

(Explanation of Magnet 2)

Figure 3A:
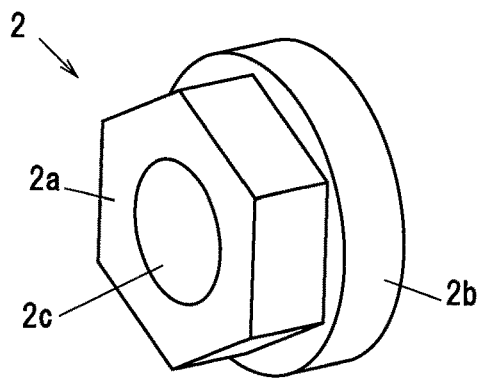
FIG. 3A is a perspective view showing a magnet.
Figure 3B:
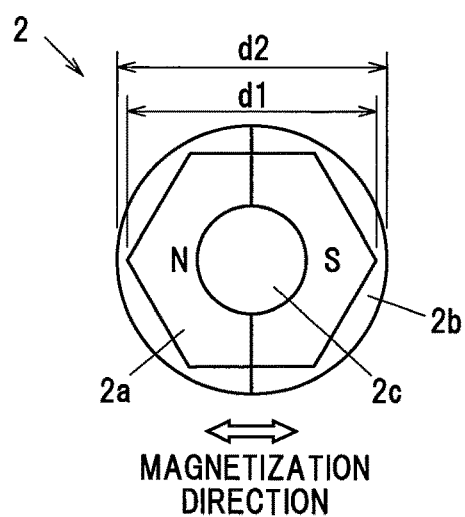
FIG. 3B is a plan view showing the magnet.
Figure 3C:
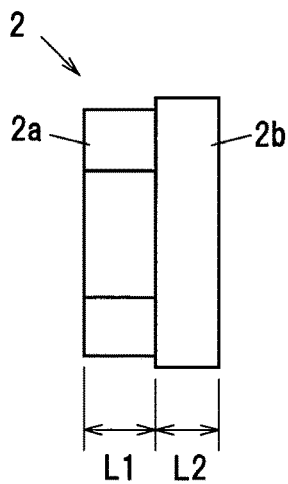
FIG. 3C is a side view showing the magnet.

As shown in FIGS. 3A to 3C, in the present embodiment, the magnet 2 is made of a nut for being screwed to the turbo shaft 21 and fixing the compressor wheel 17 to the turbo shaft 21. In other words, the magnet 2 in the present embodiment is produced by magnetizing the nut for fixing the compressor wheel 17.

The magnet 2 is magnetized with two different magnetic poles (N pole and S pole) in the circumferential direction around the rotation axis of the compressor wheel 17. The magnetization direction of the magnet 2 is a direction (radial direction) perpendicular to the axial direction of the rotation axis. As a result, the magnetic flux can reach the position more distant from the magnet 2 in the radial direction, and the sensitivity of the turbo rotation sensor 1 can be improved. As the magnet 2, it is preferable to use a material having a large magnetic force and less demagnetization at high temperatures. In the present embodiment, an Fe—Cr—Co magnet (iron chrome cobalt magnet) is used as the magnet 2.

Further, in the present embodiment, the magnet 2 includes a tool locking portion 2a for locking a fastening tool, and a flange-shaped collar portion 2b integrally provided at an end in the axial direction of the tool locking portion 2a. A threaded hole 2c penetrating the magnet 2 is formed in the central portion of the magnet 2 in a cross section perpendicular to the axial direction, and the magnet 2 is formed in an annular shape as a whole. The end portion of the turbo shaft 21 is formed with a male threaded portion (not shown) having threads formed on its outer circumferential surface, and by screwing the threaded hole 2c to the male threaded portion, the magnet 2 is fixed to the turbo shaft 21 and the compressor wheel 17.

Herein, the case where the tool locking portion 2a is formed in a hexagonal shape when viewed from one side (the intake side) in the axial direction will be described, but the shape of the tool locking portion 2a is not limited thereto. In the present embodiment, the maximum outer diameter (distance between opposing corner portions) d1 of the tool locking portion 2a is set at 8.1 mm, and the axial length L1 thereof is set at 2.4 mm.

The collar portion 2b is formed in a short columnar shape (short cylindrical shape). The outer diameter d2 of the collar portion 2b is larger than the maximum outer diameter d1 of the tool locking portion 2a. Herein, the outer diameter d2 of the collar portion 2b is set at 9.0 mm, and the axial length L2 thereof is set at 2.0 mm. The axial length of the entire magnet 2 is 4.4 mm.

(Explanation of Sensor Section 3)

Figure 5:
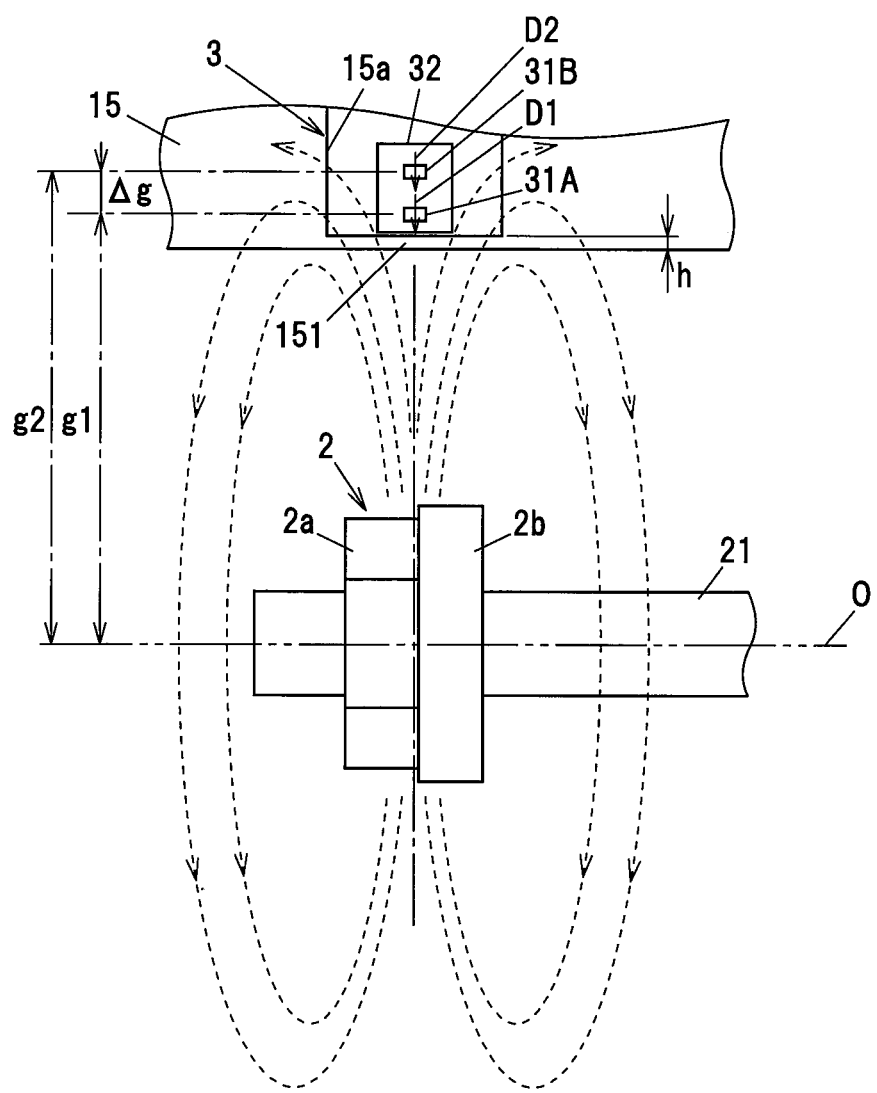
FIG. 5 is a diagram for explaining positional relationships between magnetic detection elements and the magnet.

As shown in FIGS. 1 and 5, the sensor section 3 is housed in a sensor hole 15a as a receiving hole formed in the compressor housing 15. Note that in FIG. 5, the illustration of the compressor wheel 17 is omitted. The sensor hole 15a is formed at a position corresponding to the magnet 2 of the compressor housing 15, along the radial direction of the compressor wheel 17.

In the present embodiment, the sensor hole 15a is a blind hole formed so as not to penetrate the compressor housing 15, and is open on the outer surface of the compressor housing 15 but not open on the inner surface of the compressor housing 15. This makes it possible to prevent the sensor section 3 from being damaged due to the pressure of intake air and the like, thereby improving the reliability. Herein, the thickness h of the bottom wall 151 of the compressor housing 15 between the sensor hole 15a and the intake passage 13 is set at 1.0 mm. Note that the sensor section 3 may be provided with a flange portion, and the flange portion may be fixed to the outer surface of the compressor housing 15 with a fixing member such as a bolt. This facilitates positioning when the sensor section 3 is accommodated in the sensor hole 15*a*, so that a gap is formed between the bottom wall 151 of the compressor housing 15 and the sensor section 3.

In consideration of the difference in thermal expansion of the material constituting the sensor section 3 and the compressor housing 15 in the use environment, the tip part of the sensor section 3 is accommodated in the sensor hole 15*a* so as to be close to the bottom wall 151 of the compressor housing 15. The sensor section 3 is disposed in such a manner that the tip portion thereof is aligned with the magnet 2 in the radial direction around the rotation axis of the compressor wheel 17 with the sensor section 3 accommodated in the sensor hole 15*a*. It should be noted that the tip portion of the sensor section 3 may be in contact with the bottom wall 151 of the compressor housing 15.

Figure 4A:
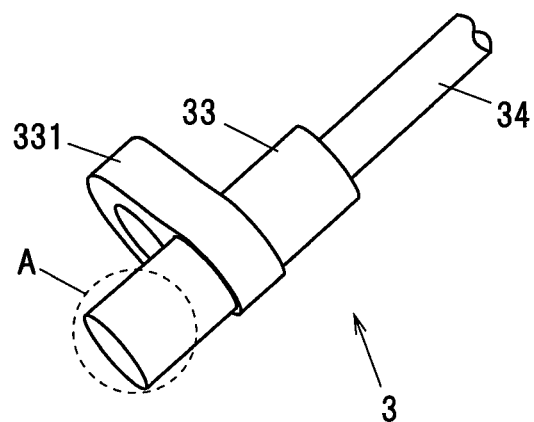
FIG. 4A is a perspective view of a sensor section.
Figure 4B:
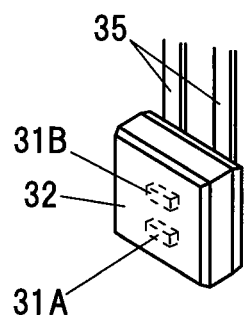
FIG. 4B is a perspective view of a sensor module.

The first and second magnetic detection elements 31A and 31B are housed in the tip portion (the portion denoted by reference character A in FIG. 4A) of the sensor section 3. The first magnetic detection element 31A and the second magnetic detection element 31B have the same magnetic field sensitivity. Further, the first and second magnetic detection elements 31A and 31B are arranged side by side in the depth direction of the sensor hole 15*a*, that is, in the radial direction of the compressor wheel 17, and the first magnetic detection element 31A is arranged closer to the bottom wall 151 side of the sensor hole 15*a* than the second magnetic detection element 31B.

As the first and second magnetic detection elements 31A and 31B, a GMR (Giant Magneto-Resistive) sensor, a Hall element (Hall IC), an AMR (Anisotropic Magneto-Resistive) sensor, a TMR (Tunneling Magneto-Resistive) sensor or the like can be used. In the present embodiment, the first and second magnetic detection elements 31A and 31B are GMR sensors, and have a multilayer film in which a ferromagnetic thin film (F layer) and a non-ferromagnetic thin film (NF layer) are stacked as a magnetic field detection portion.

The first and second magnetic detection elements 31A and 31B are incorporated in the sensor module 32. The sensor module 32 outputs an electric signal corresponding to the difference between the magnetic field detection results of the first and second magnetic detection elements 31A and 31B. The sensor module 32 is covered with a sensor housing 33 made of a mold resin. In the present embodiment, the sensor housing 33 is formed in a substantially columnar shape. In addition, a fixing flange 331 for attaching the sensor section 3 to the compressor housing 15 is integrally provided in the sensor housing 33. Note that the shape and the like of the sensor housing 33 are merely one example, and are not limited to the illustrated example.

A signal line 34 for outputting an electric signal from the sensor module 32 is extended from the base end portion of the sensor housing 33. A lead wire 35 for outputting an electric signal corresponding to the difference between the magnetic field detection results of the first and second magnetic detection elements 31A and 31B is extended from the sensor module 32, and the lead wire 35 and a core wire (not shown) of the signal line 34 are electrically connected together within the sensor housing 33 by resistance welding or the like. Note that instead of the signal line 34, an electric signal may be outputted by connector connection.

A tip portion of the signal line 34 extended from the sensor section 3 is connected to an ECU (electronic control unit) of a vehicle (not shown). Within this ECU is mounted a computing portion 4 for computing the rotation speed of the compressor wheel 17, that is, the rotation speed of the turbocharger 10, based on the electric signal from the sensor section 3, that is, the electric signal corresponding to the difference between the magnetic field detection results of the first and second magnetic detection elements 31A and 31B. The computing portion 4 counts, for example, the number of times that the electric signal becomes equal to or higher than a predetermined threshold voltage over a predetermined time, and computes the rotation speed of the turbocharger 10 based on the counted number.

Note that although the case where the computing portion 4 is mounted in the ECU has been described herein, the computing portion 4 may be provided separately from the ECU. For example, the computing portion 4 may be modularized and may output the rotation speed of the turbocharger 10 computed by the computing portion 4 to the ECU. Further, the computing portion 4 may be mounted in the sensor section 3. Further, electric signals indicating the detection result of the first magnetic detection element 31A and the detection result of the second magnetic detection element 31B may be sent to the computing section 4 by the signal lines, respectively, and the difference between both the detection results may be taken in the computing section 4.

The detection axis D1 of the first magnetic detection element 31A and the detection axis D2 of the second magnetic detection element 31B are indicated by arrows, respectively. The first and second magnetic detection elements 31A and 31B detect the magnetic field in the directions of the detection axes D1 and D2 and output a signal of a voltage corresponding to the magnetic field strength. The detection axes D1 and D2 are parallel to the radial direction of the compressor wheel 17 indicated by a chain line in FIG. 5. In addition, the first and second magnetic detection elements 31A and 31B are arranged in such a manner that the detection axes D1 and D2 are on the same straight line.

When the distances between the rotation axis O of the compressor wheel 17 in the radial direction of the compressor wheel 17 and the magnetic field detection portions in the first and second magnetic detection elements 31A and 31B (central portions of the first and second magnetic detection elements 31A and 31B) are g1 and g2 respectively, g2 is longer than g1, and g1 is 17.5 mm, for example, and g2 is 19.25 mm, for example, and the difference Ag therebetween is 1.75 mm, but this distance difference Ag may be made larger. That is, g2 is preferably 1.05 times or more, preferably 1.1 times or more of g1. Also, to prevent the influences of external noise from being greatly different, g2 may be 1.5 times or less of g1.

Due to this difference in distance, the magnetic field detected by the second magnetism detecting element 31B becomes smaller than the magnetic field detected by the first magnetic detecting element 31A. Then, the turbo rotation sensor 1 is capable of measuring the rotation speed of the compressor wheel 17 based on the difference between the detection results of the first and second magnetic detection elements 31A and 31B generated due to the difference between the radial distances from the magnet 2.

(Experiment Result)

Figure 6A:
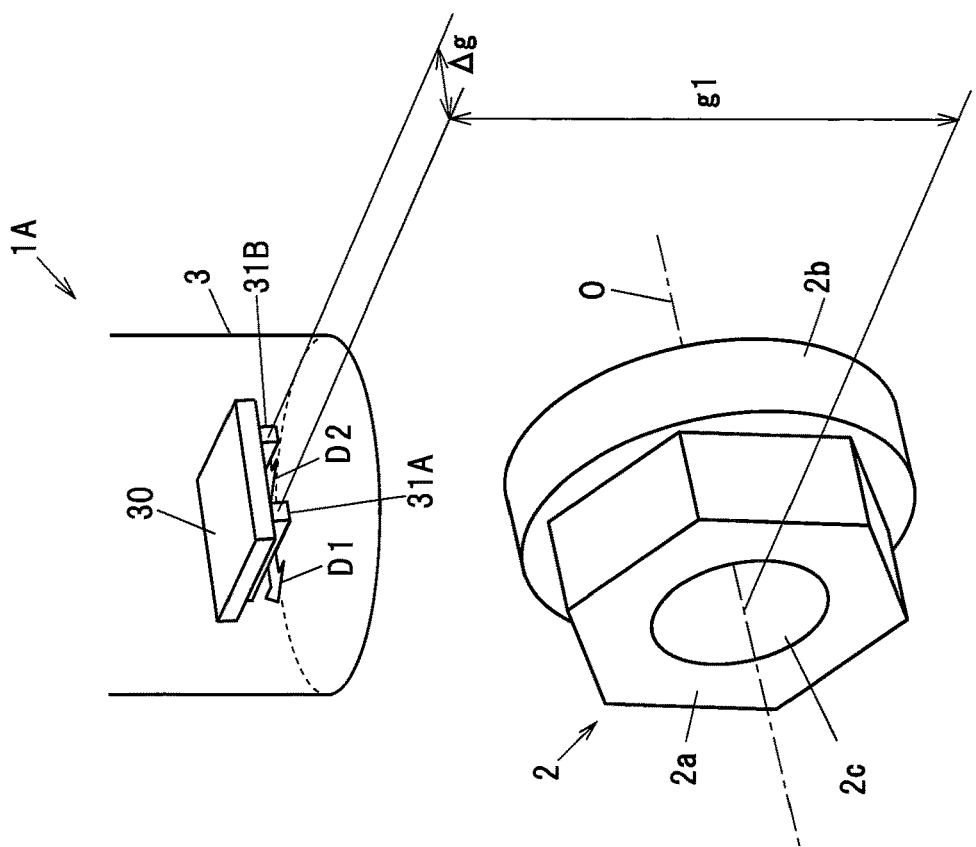
FIG. 6A is a schematic diagram showing a configuration of the turbo rotation sensor according to the embodiment.
Figure 6B:
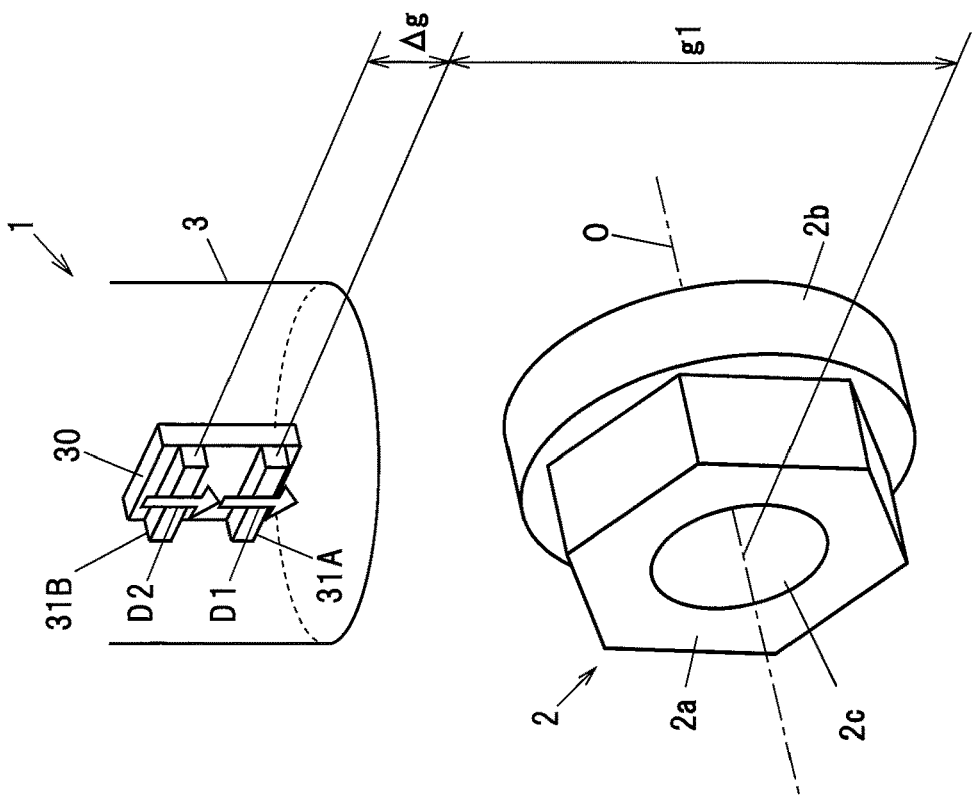
FIG. 6B is a schematic view showing a configuration of a turbo rotation sensor according to a comparative example.

FIG. 6A is a schematic diagram showing a configuration of the turbo rotation sensor 1 according to the present embodiment. FIG. 6B is a schematic diagram showing a configuration of a turbo rotation sensor 1A according to a comparative example. As shown in FIGS. 6A and 6B, the first and second magnetic detection elements 31A and 31B are mounted on one substrate 30 within the sensor module 32. Their respective detection axes D1 and D2 are parallel to the substrate 30. In the turbo rotation sensor 1 according to the present embodiment, the substrate 30 is disposed perpendicularly to the direction parallel to the rotation axis O of the compressor wheel 17. In the turbo rotation sensor 1, the distance g1 between the rotation axis O and the first magnetic detection element 31A and the distance Δg between the first magnetic detection element 31A and the second magnetic detection element 31B are the same dimensions as those described with reference to FIG. 5 (g1=17.5 mm, Δg=1.75 mm, h=1.0 mm). Also, the compressor housing 15 is made of aluminum.

On the other hand, in the turbo rotation sensor 1A according to the comparative example, the orientation of the substrate 30 is perpendicular to the radial direction of the compressor wheel 17, and the detection axes D1 and D2 are parallel to the rotation axis O of the compressor wheel 17. The first and second magnetic detection elements 31A and 31B are arranged parallel to the rotation axis O. In the turbo rotation sensor 1A, the distance g1 between the rotation axis O and the first magnetic detection element 31A, and the distance Δg between the first magnetic detection element 31A and the second magnetic detection element 31B are the same dimensions as those described with reference to FIG. 5 (g1=17.5 mm, Δg=1.75 mm, h=1.0 mm). Also, the compressor housing 15 is made of aluminum.

Figure 7A:
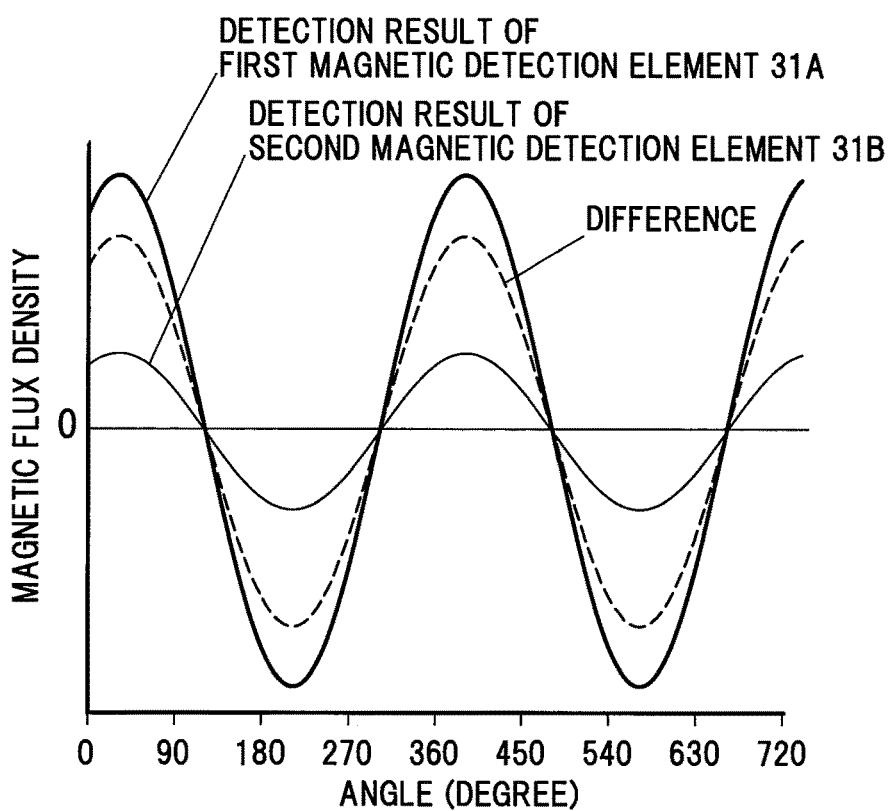
FIG. 7A is a graph showing detection results of the first and second magnetic detection elements of the turbo rotation sensor according to the embodiment and a difference between the detection results.
Figure 7B:
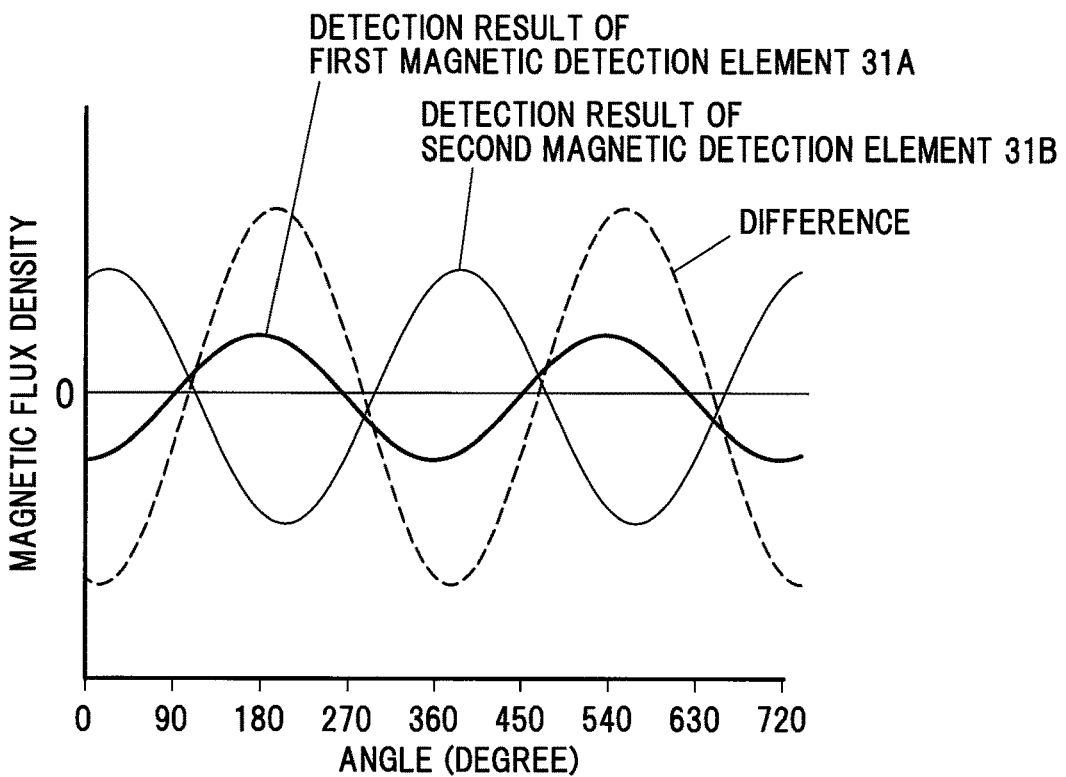
FIG. 7B is a graph showing detection results of the first and second magnetic detection elements of the turbo rotation sensor according to the comparative example and a difference between the detection results.

FIG. 7A is a graph showing respective magnetic field detection results (magnetic flux densities) of the first and second magnetic detection elements 31A and 31B of the turbo rotation sensor 1 according to the present embodiment on the vertical axis, and showing the rotation angle from the reference position of the compressor wheel 17 and the magnet 2 on the horizontal axis. Further, in FIG. 7A, the difference between the respective magnetic field detection results of the first and second magnetic detection elements 31A and 31B is indicated by a broken line. FIG. 7B is a graph showing the magnetic field detection results of the first and second magnetic detection elements 31A and 31B of the turbo rotation sensor 1A according to the comparative example and the difference therebetween on the vertical axis and the horizontal axis common to FIG. 7A.

As shown in FIG. 7A, the magnetic flux density detected by the second magnetic detection element 31B is greatly reduced with respect to the magnetic flux density detected by the first magnetic detection element 31A. This degree of reduction is larger than the degree of reduction assumed by the distance Δg between the first magnetic detection element 31A and the second magnetic detection element 31B. A reason why the magnetic flux density greatly decreases in this manner is considered to be the effect of eddy currents generated around the sensor hole 15a in the compressor housing 15 when the compressor wheel 17 and the magnet 2 rotate at a high speed. According to the verification result by the present inventor, it has been confirmed that when the number of rotations of the compressor wheel 17 is 200,000 rpm, the magnetic flux density detected by the second magnetism detecting element 31B decreases with respect to the magnetic flux density detected by the first magnetic detecting element 31A at a rate greater than when the same number of rotations is several thousands rpm. FIGS. 7A and 7B show the magnetic field detection results when the compressor wheel 17 rotates at 200,000 rpm.

As shown in the graphs of FIGS. 7A and 7B, the difference between the detection results in the turbo rotation sensor 1 according to the present embodiment is greater in amplitude than the difference between the detection results in the turbo rotation sensor 1A according to the comparative example. Therefore, even if it is affected by external noise, the rotational speed of the compressor wheel 17 can be measured more accurately.

(Operation and Advantageous Effects of the Embodiment)

According to the embodiment of the present invention described above, since the rotational speed of the compressor wheel 17 can be measured based on the difference between the detection results of the first and second magnetic detection elements 31A and 31B, even if the sensitivities of the first and second magnetic detection elements 31A and 31B change due to the temperature rise due to the heat of the turbine 12 for example, the changes are canceled out so the rotational speed of the compressor wheel 17 can be accurately measured. Further, since the first and second magnetic detection elements 31A and 31B are arranged side by side in the radial direction of the compressor wheel 17, the influences of external noise on the measurement results of the first and second magnetic detection elements 31A and 31B are also canceled out so the rotational speed of the compressor wheel 17 can be accurately measured.

Further, as shown in FIG. 7A, since the sufficient difference appears between these detection results due to the difference between the distances between the rotation axis O of the compressor wheel 17 and the first and second magnetic detection elements 31A and 31B, the rotational speed of the compressor wheel 17 can be measured by comparison of that difference with a predetermined threshold voltage. Further, even when the spacing between the first magnetic detection element 31A and the second magnetic detection element 31B is widened, there is no need to increase the diameter of the tip portion of the sensor section 3 and the inner diameter of the sensor hole 15a, and it is possible to suppress a decrease in the strength of the compressor housing 15.

Further, according to the present embodiment, since the tip portion of the sensor section 3 including the first and second magnetic detection elements 31A and 31B is accommodated in the sensor hole 15a of the compressor housing 15, the external noise reaching the first and second magnetic detection elements 31A and 31B is suppressed by the compressor housing 15. Furthermore, by forming the sensor hole 15a that houses the sensor section 3 so as not to pass through the compressor housing 15, it is possible to suppress the damage to the sensor section 3 due to the wind pressure of the intake air, and to improve the reliability.

Summary of the Embodiment

Next, the technical ideas grasped from the above-described embodiments will be described with the aid of reference numerals and the like in the embodiments. It should be noted, however, that each of the reference numerals and the like in the following description does not limit the constituent elements in the claims to the members and the like specifically shown in the embodiments.

[1] A turbo rotation sensor (1), which is configured to be mounted on a turbocharger (10) provided with a compressor (11) including a rotary driven compressor wheel (17) housed in a compressor housing (15), to detect rotation speed of the compressor wheel (17), comprising: a magnet (2) rotatable integrally with the compressor wheel (17) and having a plurality of magnetic poles in a circumferential direction of the compressor wheel (17); and a sensor section (3) attached to the compressor housing (15) and including first and second magnetic detection elements (31A, 31B) capable of detecting a magnetic field in a radial direction of the compressor wheel (17) due to the magnet (2), wherein the first and second magnetic detection elements (31A, 31B) are arranged side by side in the radial direction of the compressor wheel (17), wherein the rotation speed of the compressor wheel (17) can be measured based on a difference between detection results of the first and second magnetic detection elements (31A, 31B) resulting from a difference between their respective distances (g1, g2) from the magnet (2).

[2] The turbo rotation sensor (1) according to [1], wherein the sensor section (3) is disposed in a receiving hole (sensor hole 15a) formed in the compressor housing (15) in the radial direction of the compressor wheel (17).

[3] The turbo rotation sensor (1) according to [2], wherein the receiving hole (sensor hole 15a) is a blind hole (sensor hole 15a) which is open on an outer surface of the compressor housing (15) but not open on an inner surface of the compressor housing (15).

[4] The turbo rotation sensor (1) according to any one of [1] to [3], wherein the first and second magnetic detection elements (31A, 31B) are arranged in such a manner that their respective magnetic field detection axes (D1, D2) are parallel to the radial direction of the compressor wheel (17).

[5] The turbo rotation sensor (1) according to [4], wherein the first and second magnetic detection elements (31A, 31B) are arranged in such a manner that their respective magnetic field detection axes (D1, D2) are on a same straight line.

[6] The turbo rotation sensor (1) according to any one of [1] to [5], wherein a distance g2 between a rotation axis (O) of the compressor wheel (17) and a center of the second magnetic detection element (31B) is 1.05 times or more a distance g1 between the rotation axis (O) and a center of the first magnetic detection element (31A).

[7] The turbo rotation sensor (1) according to any one of [1] to [6], wherein a distance g2 between a rotation axis (O) of the compressor wheel (17) and a center of the second magnetic detection element (31B) is 1.5 times or less a distance g1 between the rotation axis and a center of the first magnetic detection element (31A).

[8] A turbocharger (10), comprising: a compressor (11) including a rotary driven compressor wheel (17) housed in a compressor housing (15); a magnet (2) rotatable integrally with the compressor wheel (17) and having a plurality of magnetic poles in a circumferential direction of the compressor wheel (17); and a sensor section (3) attached to the compressor housing (15) and including first and second magnetic detection elements (31A, 31B) capable of detecting a magnetic field in a radial direction of the compressor wheel (17) due to the magnet (2), wherein the first and second magnetic detection elements (31A, 31B) are arranged side by side in the radial direction of the compressor wheel (17), wherein the rotation speed of the compressor wheel (17) can be measured based on a difference between detection results of the first and second magnetic detection elements (31A, 31B) resulting from a difference between their respective distances (g1, g2) from the magnet (2).

[9] The turbocharger (10) according to [8], wherein the sensor section (3) is disposed in a receiving hole (sensor hole 15a) formed in the compressor housing (15) in the radial direction of the compressor wheel (17).

[10] The turbocharger (10) according to [9], wherein the receiving hole (sensor hole 15a) is a blind hole (sensor hole 15a) which is open on an outer surface of the compressor housing (15) but not open on an inner surface of the compressor housing (15).

[11] The turbocharger (10) according to any one of [8] to [10], wherein the first and second magnetic detection elements (31A, 31B) are arranged in such a manner that their respective magnetic field detection axes (D1, D2) are parallel to the radial direction of the compressor wheel (17).

[12] The turbocharger (10) according to [11], wherein the first and second magnetic detection elements (31A, 31B) are arranged in such a manner that their respective magnetic field detection axes (D1, D2) are on a same straight line.

[13] The turbocharger (10) according to any one of [8] to [12], wherein a distance g2 between a rotation axis (O) of the compressor wheel (17) and a center of the second magnetic detection element (31B) is 1.05 times or more a distance g1 between the rotation axis (O) and a center of the first magnetic detection element (31A).

[14] The turbocharger (10) according to any one of [8] to [13], wherein a distance g2 between a rotation axis (O) of the compressor wheel (17) and a center of the second magnetic detection element (31B) is 1.5 times or less a distance g1 between the rotation axis and a center of the first magnetic detection element (31A).

Although the embodiment of the present invention has been described above, the embodiment described above does not limit the invention according to the claims. It should also be noted that not all combinations of the features described in the embodiments are indispensable to the means for solving the problem of the invention.

Further, the present invention can appropriately be modified and carried out within the scope not deviating from the spirit thereof. For example, although in the above-described embodiment, there has been described the case in which both the first and second magnetic detection elements 31A and 31B are disposed in such a manner that their respective detection axes D1 and D2 are on the same straight line, the first magnetic detection element 31A and the second magnetic detection element 31B may slightly be shifted along the axial direction or circumferential direction of the compressor wheel 17 within the sensor module 32.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A turbo rotation sensor, which is configured to be mounted on a turbocharger provided with a compressor including a rotary driven compressor wheel housed in a compressor housing, to detect rotation speed of the compressor wheel, comprising:
 a magnet rotatable integrally with the compressor wheel and having a plurality of magnetic poles in a circumferential direction of the compressor wheel; and
 a sensor section attached to the compressor housing and including first and second magnetic detectors capable of detecting a magnetic field in a radial direction of the compressor wheel due to the magnet,
 wherein the first and second magnetic detectors are arranged side by side in the radial direction of the compressor wheel,
 wherein the rotation speed of the compressor wheel can be measured based on a difference between detection results of the first and second magnetic detectors resulting from a difference between their respective distances from the magnet, and
 wherein the first and second magnetic detectors are arranged in such a manner that their respective magnetic field detection axes are parallel to the radial direction of the compressor wheel, and their respective magnetic field detection axes are directed toward a rotation axis of the compressor wheel.

2. The turbo rotation sensor according to claim 1, wherein the sensor section is disposed in a receiving hole formed in the compressor housing in the radial direction of the compressor wheel.

3. The turbo rotation sensor according to claim 2, wherein the receiving hole is a blind hole which is open on an outer surface of the compressor housing but not open on an inner surface of the compressor housing.

4. The turbo rotation sensor according to claim 1, wherein the first and second magnetic detectors are arranged in such a manner that their respective magnetic field detection axes are on a same straight line.

5. The turbo rotation sensor according to claim 1, wherein a distance g2 between the rotation axis of the compressor wheel and the center of the second magnetic detector is 1.05 times or more a distance g1 between the rotation axis and the center of the first magnetic detector.

6. The turbo rotation sensor according to claim 1, wherein a distance g2 between the rotation axis of the compressor wheel and the center of the second magnetic detector is 1.5 times or less a distance g1 between the rotation axis and the center of the first magnetic detector.

7. The turbo rotation sensor according to claim 1, wherein the first and second magnetic detectors are aligned along a radial direction of the magnet.

8. A turbocharger, comprising:
a compressor including a rotary driven compressor wheel housed in a compressor housing; a magnet rotatable integrally with the compressor wheel and having a plurality of magnetic poles in a circumferential direction of the compressor wheel; and
a sensor section attached to the compressor housing and including first and second magnetic detectors capable of detecting a magnetic field in a radial direction of the compressor wheel due to the magnet,
wherein the first and second magnetic detectors are arranged side by side in the radial direction of the compressor wheel,
wherein a rotation speed of the compressor wheel can be measured based on a difference between detection results of the first and second magnetic detectors resulting from a difference between their respective distances from the magnet, and
wherein the first and second magnetic detectors are arranged in such a manner that their respective magnetic field detection axes are parallel to the radial direction of the compressor wheel, and their respective magnetic field detection axes are directed toward a rotation axis of the compressor wheel.

9. The turbocharger according to claim 8, wherein the sensor section is disposed in a receiving hole formed in the compressor housing in the radial direction of the compressor wheel.

10. The turbocharger according to claim 9, wherein the receiving hole is a blind hole which is open on an outer surface of the compressor housing but not open on an inner surface of the compressor housing.

11. The turbocharger according to claim 8, wherein the first and second magnetic detectors are arranged in such a manner that their respective magnetic field detection axes are on a same straight line.

12. The turbocharger according to claim 8, wherein a distance g2 between the rotation axis of the compressor wheel and the center of the second magnetic detector is 1.05 times or more a distance g1 between the rotation axis and the center of the first magnetic detector.

13. The turbocharger according to claim 8, wherein a distance g2 between the rotation axis of the compressor wheel and the center of the second magnetic detector is 1.5 times or less a distance g1 between the rotation axis and the center of the first magnetic detector.

14. The turbocharger according to claim 8, wherein the first and second magnetic detectors are aligned along a radial direction of the magnet.

* * * * *